Patented Aug. 9, 1932

1,870,358

UNITED STATES PATENT OFFICE

LOGAN A. DILS, OF CHICAGO, ILLINOIS, ASSIGNOR TO KELLOGG-DILS, INC., OF CHICAGO, ILLINOIS, A CORPORATION OF DELAWARE

PROCESS OF TREATING PRINTED PAPER FOR USE AS PAPER MAKING STOCK

No Drawing. Application filed December 2, 1930, Serial No. 499,610. Renewed December 12, 1931.

This invention relates to a process for treating printed paper for the purpose of freeing the same from printer's ink and placing the same in condition to be used either alone or in admixture with other fibrous material for making paper such, for example, as newsprint paper.

Prior to the present invention, many efforts have been made to remove the ink from waste printed paper, to the end that the de-inked paper may be used as raw material in the paper making art, either alone or mixed with other paper making fibers. Such efforts, however, have only been partially successful. The ink has not been completely removed from the printed paper, and the stock made from such paper is, therefore, injuriously contaminated by the presence of the ink therein, and the same cannot be used for making a satisfactory print paper. For this reason, the practical use of such stock for commercial operations has been limited to the use of a small percentage thereof in admixture with new stock.

One of the objects of the present invention is to provide a process whereby the ink shall be substantially all removed from the paper, to the end that the stock thus secured may be used alone in making newsprint paper, or, if preferred, shall form the main body of the stock mixed with a small percentage of sulphite or other fiber for making newsprint paper. A further object is to remove the ink from the printed paper at a minimum cost, to the end that the cost of the newsprint paper shall be largely decreased. A still further object is to produce from old printed paper newsprint paper of a quality equal to the original paper from which the ink has been removed.

With these objects in view, printed paper, whether newspaper or other printed paper, is placed in any suitable fiber defiberizer (such for example that shown, described and claimed in my application Serial No. 456,270), and the paper is therein shredded or finely divided by passing through the defiberizer while being sprayed with cold water. Any other means by which the paper is finely divided may be employed.

In any suitable commercial beater used in the paper making art for beating fibers is placed a solution consisting of

| | Per cent |
|---|---|
| Water | 60 |
| Sodium hydroxide | 10 |
| Sodium borate | 25 |
| Trisodium phosphate | 4 |
| Potassium carbonate | 1 | all by weight.

This solution is heated in the beater to 212° F. or more (as high as 225° F.) at atmospheric pressure. The printpaper, shredded or otherwise finely divided as above described, is placed in the hot solution in the beater, and the same beaten for from 5 to 7 minutes or longer, depending somewhat on the character of the ink and paper being treated. As a result of this operation in the beater, the carbon and other ingredients of the ink rise to the surface of the solution and are removed by skimming or otherwise, after which the beaten mass is removed from the beater and washed in cold water, though warm water may be used if desired. The beaten, washed mass thus obtained may be used either alone or mixed with sulphite or other paper making fiber for making newsprint paper. It will be found that the mass is practically free from the deleterious printer's ink, and that paper made from this mass alone is equal in color, strength and other respects to newsprint paper made from new paper stock ordinarily used for making such paper, and this at a cost very much less than is the case when newsprint paper is made from new stock.

What is claimed is:
1. The process of making paper-making stock from printed paper, which consists in finely shredding printed paper, then beating it at atmospheric pressure in a hot solution containing sodium hydroxide, sodium borate, trisodium phosphate and potassium carbonate, and then washing the beaten mass.
2. The process of making paper-making stock from printed paper, which consists in finely shredding printed paper in the presence of moisture, then subjecting the same to the action of a solution of sodium hydroxide, sodium borate, trisodium phosphate and potassium carbonate, and then washing the mass in water.

3. The process of making paper-making stock from printed paper, which consists in finely dividing printed paper, then subjecting the same to the action of a solution containing the following ingredients in approximately the following proportions by weight, to wit: water 60%, sodium hydroxide 10%, sodium borate 25%, trisodium phosphate 4%, and potassium carbonate 1%, and then washing the mass in water.

4. The process of making paper-making stock from printed paper, which consists in finely dividing printed paper, then beating the same for from 5 to 7 minutes in a solution heated to approximately 212° F., said solution being composed of approximately 60% water, 10% sodium hydroxide, 25% sodium borate, 4% trisodium phosphate, and 1% potassium carbonate, and then washing the beaten mass.

5. The process of making paper-making stock from printed paper, which consists in finely dividing printed paper, then beating the same for approximately 6 minutes in a hot solution of sodium hydroxide, sodium borate, trisodium phosphate and potassium carbonate, then skimming the solution, removing the beaten mass from the solution, and then washing the said mass.

6. The process of making paper-making stock from printed paper, which consists in shredding or otherwise finely dividing the paper in the presence of moisture, then beating the same for from 5 to 7 minutes in a solution heated to approximately 212° F., said solution being composed of approximately 60% water, 10% sodium hydroxide, 25% sodium borate, 4% trisodium phosphate, and 1% potassium carbonate, skimming the solution, removing the mass therefrom, and then washing said mass.

In testimony whereof I have signed this specification.

LOGAN A. DILS.